United States Patent
Foster et al.

(10) Patent No.: US 8,984,321 B2
(45) Date of Patent: Mar. 17, 2015

(54) JITTER REDUCTION METHOD AND APPARATUS FOR SYNCHRONISED USB DEVICES

(75) Inventors: Peter Graham Foster, Parkside (AU); Alex Kouznetsov, Melbourne (AU)

(73) Assignee: Chronologic Pty, Ltd., Adelaide South Australia (AU)

( * ) Notice: Subject to any disclaimer, the term of this patent is extended or adjusted under 35 U.S.C. 154(b) by 490 days.

(21) Appl. No.: 13/321,707

(22) PCT Filed: May 20, 2010

(86) PCT No.: PCT/AU2010/000604
§ 371 (c)(1),
(2), (4) Date: Jan. 24, 2012

(87) PCT Pub. No.: WO2010/132943
PCT Pub. Date: Nov. 25, 2010

(65) Prior Publication Data
US 2012/0131374 A1     May 24, 2012

Related U.S. Application Data

(60) Provisional application No. 61/179,904, filed on May 20, 2009.

(51) Int. Cl.
*G06F 1/00* (2006.01)
*G06F 1/08* (2006.01)
(Continued)

(52) U.S. Cl.
CPC .. *G06F 1/08* (2013.01); *G06F 1/12* (2013.01); *G06F 13/4022* (2013.01);
(Continued)

(58) Field of Classification Search
CPC ............................ G06F 11/1679; H04B 17/00
USPC .................................................... 713/300, 500
See application file for complete search history.

(56) References Cited

U.S. PATENT DOCUMENTS 5,214,676 A * 5/1993 Wilkinson ..................... 375/371
5,566,180 A 10/1996 Eidson et al.
(Continued)

FOREIGN PATENT DOCUMENTS

JP     A 2002-514835     5/2002
JP     A 2004-506974     3/2004
(Continued)

OTHER PUBLICATIONS

"Universal Serial Bus Specification;" Apr. 27, 2000; pp. 1-622; Revision 2.0.
(Continued)

*Primary Examiner* — Mohammed Rehman
(74) *Attorney, Agent, or Firm* — Oliff PLC

(57) ABSTRACT

A method of reducing jitter in a local clock of a synchronised USB device attached to a USB Hub, the USB Hub having a local clock and repeater circuitry, comprising: observing a USB data stream with the USB Hub, the data stream having a data stream bit rate; the USB Hub decoding a periodic signal structure in the USB data stream; the USB Hub generating an event signal in response to decoding of the periodic signal structure; and the USB Hub locking a frequency of the local clock of the USB Hub to the periodic event signal. The local clock of the USB Hub is adapted to be a clocking source for the repeater circuitry of the USB Hub at substantially an integer multiple of a frequency of the data stream bit rate.

13 Claims, 4 Drawing Sheets

(51) Int. Cl.
  *G06F 1/12* (2006.01)
  *G06F 13/40* (2006.01)
  *G06F 13/42* (2006.01)
  *H04L 7/04* (2006.01)
  *H04L 7/08* (2006.01)

(52) U.S. Cl.
  CPC ....... *G06F 13/4027* (2013.01); *G06F 13/4282* (2013.01); *G06F 2213/0042* (2013.01); *H04L 7/04* (2013.01); *G06F 13/405* (2013.01); *H04L 7/08* (2013.01)
  USPC .......................................................... 713/501

(56) References Cited

U.S. PATENT DOCUMENTS

| | | | |
|---|---|---|---|
| 6,092,210 | A | 7/2000 | Larky et al. |
| 6,278,710 | B1 | 8/2001 | Eidson |
| 6,343,364 | B1 | 1/2002 | Leydier et al. |
| 6,665,316 | B1 | 12/2003 | Eidson |
| 6,741,952 | B2 | 5/2004 | Eidson |
| 7,093,151 | B1 | 8/2006 | Williams |
| 7,251,199 | B2 | 7/2007 | Eidson |
| 7,539,793 | B2 | 5/2009 | Foster et al. |
| 7,830,874 | B2 * | 11/2010 | Cornwall et al. ............. 370/389 |
| 8,102,904 | B2 * | 1/2012 | Mejia ............................ 375/225 |
| 2003/0174734 | A1 * | 9/2003 | Compton et al. ............. 370/503 |
| 2004/0088445 | A1 | 5/2004 | Weigold et al. |
| 2004/0148539 | A1 | 7/2004 | Leydier et al. |
| 2004/0207475 | A1 * | 10/2004 | Minamino et al. .............. 331/16 |
| 2006/0136768 | A1 * | 6/2006 | Liu et al. ....................... 713/400 |
| 2006/0217068 | A1 * | 9/2006 | Angelopoulos .............. 455/63.1 |
| 2007/0222525 | A1 * | 9/2007 | Shimizu .......................... 331/16 |
| 2009/0021311 | A1 * | 1/2009 | Grewing et al. ................ 331/34 |
| 2009/0222685 | A1 | 9/2009 | Foster et al. |
| 2009/0284297 | A1 * | 11/2009 | Ebuchi .......................... 327/291 |
| 2010/0066435 | A1 * | 3/2010 | Siprak et al. .................. 327/530 |

FOREIGN PATENT DOCUMENTS

| | | |
|---|---|---|
| JP | A 2004-234659 | 8/2004 |
| JP | A 2006-502656 | 1/2006 |
| WO | WO 99/57828 A1 | 11/1999 |
| WO | WO 02/14992 A1 | 2/2002 |
| WO | WO 2004/034557 A2 | 4/2004 |
| WO | WO 2007/092997 A1 | 8/2007 |
| WO | WO 2008/138053 A1 | 11/2008 |

OTHER PUBLICATIONS

"Universal Serial Bus 3.0 Specification;" Nov. 12, 2008; Revision 1.0.
International Preliminary Report on Patentability issued in International Application No. PCT/AU2010/000604 dated Jul. 25, 2011.
International Search Report issued in International Application No. PCT/AU2010/000604 Dated Aug. 13, 2011.

* cited by examiner

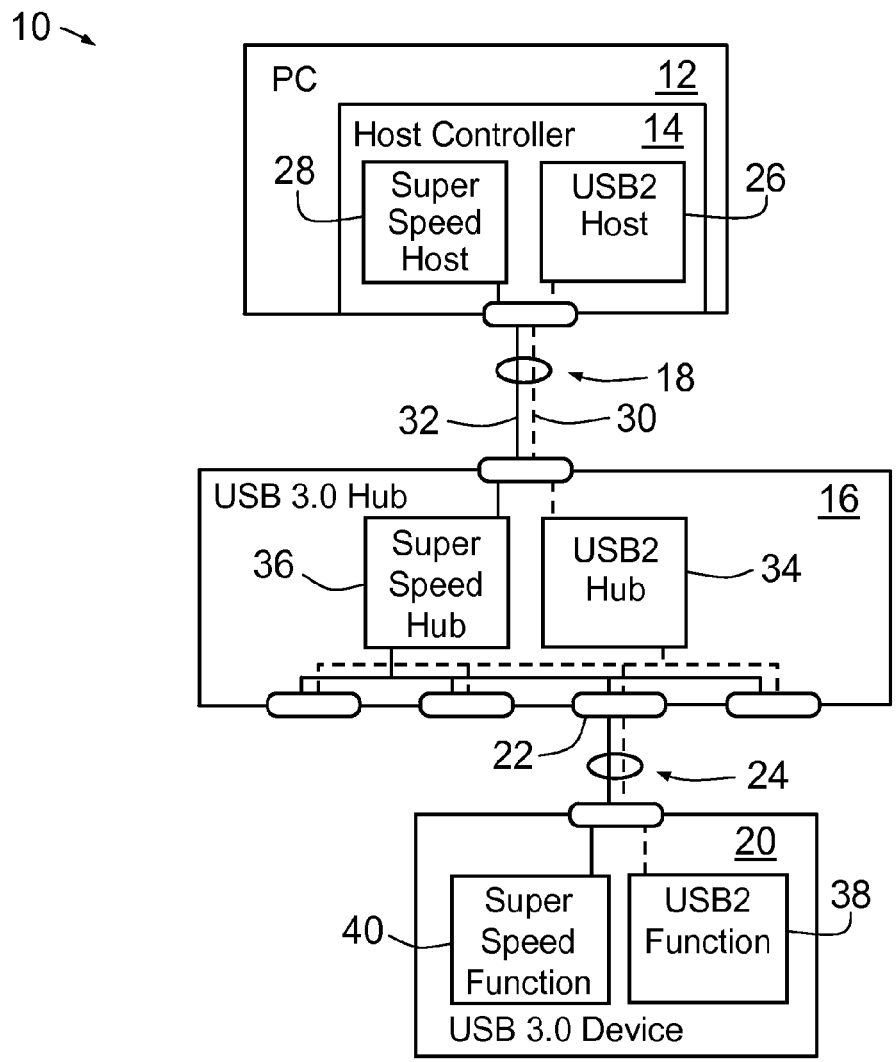
Figure 1 (*background art*)
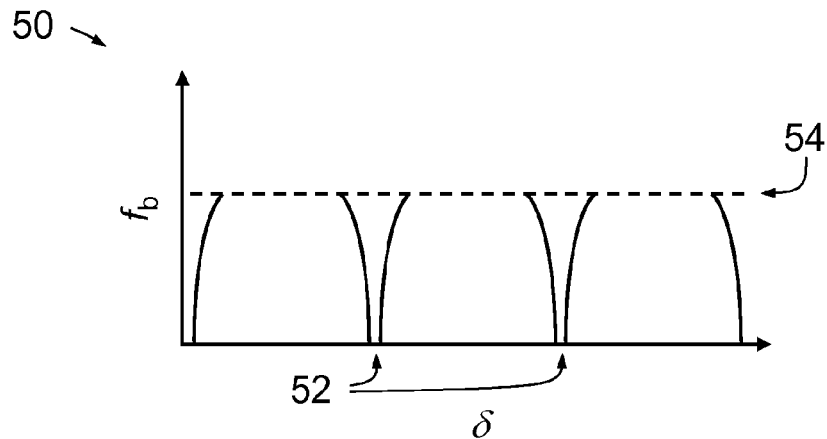
Figure 2 (*background art*)

JITTER REDUCTION METHOD AND APPARATUS FOR SYNCHRONISED USB DEVICES

RELATED APPLICATION

This application is based on and claims the benefit of the filing date of U.S. application No. 61/179,904 filed 20 May 2009, the content of which as filed is incorporated herein by reference in its entirety.

FIELD OF THE INVENTION

The present invention relates to a method and apparatus for providing a synchronization and timing system, with connectivity based on revision three of the Universal Serial Bus (USB) architecture (or USB 3.0), of particular but by no means exclusive use in providing clocks, data acquisition and automation and control of test and measurement equipment, instrumentation interfaces and process control equipment, synchronized to an essentially arbitrary degree in either a local environment or in a distributed scheme.

BACKGROUND OF THE INVENTION

The USB specification up to and including revision 2.0 was intended to facilitate the interoperation of devices from different vendors in an open architecture. USB 2.0 data is encoded using differential signalling (viz. in which two wires transfer the information) in the form of the difference between the signal levels of those two wires. The USB 2.0 specification is intended as an enhancement to the PC architecture, spanning portable, desktop and home environments.

However, USB was user focussed so the USB 2.0 specification lacked a mechanism for synchronising devices to any great precision. Several proposals attempted to address this and other deficiencies. For example, U.S. Pat. No. 6,343,364 (Leydier et al.) discloses an example of frequency locking to USB traffic, which is directed toward a smart card reader. This document teaches a local, free-running clock that is compared to USB SYNC and packet ID streams; its period is updated to match this frequency, resulting in a local clock with a nominal frequency of 1.5 MHz. This provides a degree of synchronization sufficient to read smart card information into a host PC but, as this approach is directed to a smart card reader, inter-device synchronization is not addressed.

WO 2007/092997 (Foster et al.) discloses a synchronized USB device that allows the generation of accurate clock frequencies on board the USB device regardless of the accuracy of the clock in the Host PC. The USB SOF packet is decoded by the USB device, and treated as a clock carrier signal instead of acting as a clock reference.

The carrier signal, once decoded from the USB traffic, is combined with a scaling factor to generate synchronization information and hence to synthesize a local clock signal with precise control of the clock frequency. In this way, the frequency of the local clock signal can be more accurate than the somewhat ambiguous frequency of the carrier signal.

This arrangement is said to be able to produce a local clock signal to arbitrarily high frequencies, such as a clock frequency of tens of megahertz, and thus to ensure that the local clock of each device connected to a given USB is synchronized in frequency. U.S. application Ser. No. 10/620,769 also teaches a method and apparatus to further synchronize multiple local clocks in phase by measurement of signal propagation time from the host to each device and provision of clock phase compensation on each of the USB devices.

U.S. patent application Ser. No. 12/279,328 (Foster et. al.) teaches synchronisation of the local clocks of a plurality of USB devices to a timebase received from another interface. In one embodiment, a USB device contains a local clock that is synchronised to an externally provided time signature across Ethernet using the IEEE-1588 protocol. In yet another embodiment the USB device's clock is synchronised to a timebase derived from a Global Positioning System (GPS) synchronised clock.

All of the above systems work within the bounds of conventional USB 2.0 and as such are limited in several areas. USB 2.0 is limited in range by the device response timeout. This is the window of time that the USB Host Controller allocates for receipt of a signal from a given USB device in response to a request from said USB Host Controller. The physical reach of USB 2.0 is therefore approximately 25 m.

The USB 3.0 specification was released in November 2008 and is also focussed on consumer applications. The USB 3.0 specification makes significant changes to the architecture of USB. In particular, the background art synchronisation schemes discussed above will not work with the new 5 Gb/s protocol (termed 'SuperSpeed USB') because it does away with the broadcast mechanism for SOF packets.

USB 3.0 defines two parallel and independent USB busses on the same connection cable. Firstly, the USB 2.0 bus remains unchanged (for backward compatibility) and offers Low Speed (1.5 Mb/s), Full Speed (12 Mb/s) and High Speed (480 Mb/s) protocols. The second bus—for 5 Gb/s traffic—provides the SuperSpeed USB. These busses operate independently, except that operation of the busses to a given USB device is mutually exclusive. That is, if a SuperSpeed connection is possible, then the USB 2.0 bus in disconnected to that device.

The dual-bus architecture of USB 3.0 is depicted schematically at 10 in FIG. 1. Personal Computer 12, containing USB Host Controller 14, is connected to USB 3.0 Hub 16 by first USB 3.0-compliant cable 18; USB 3.0 device 20 is connected to a downstream port 22 of USB 3.0 Hub 16 by second USB 3.0-compliant cable 24.

USB Host Controller 14 contains both a USB 2.0 Host 26 and a SuperSpeed Host 28. These two hosts 26, 28 are independent of one another, and each host 26, 28 is capable of connecting up to 127 devices (including hubs). USB 3.0-compliant cables are compound cables, containing a USB 2.0-compliant cable and a series of shielded conductors capable of transmitting SuperSpeed signals. Hence, USB 3.0-compliant cable 18 comprises USB 2.0-compliant cable 30 and shielded conductors 32.

USB 3.0 Hub 16 contains both a USB 2.0 Hub function 34 and a SuperSpeed Hub function 36, each connected directly to its respective Host 26, 28 by compound cable 18. USB 3.0 device 20 contains both a USB 2.0 device function 38 and a SuperSpeed device function 40, each connected back to its respective hub function 34, 36 of USB 3.0 Hub 16 by compound cable 24.

At enumeration of USB 3.0 device 20, SuperSpeed Host 28 checks for the presence of a SuperSpeed device function (40). If a SuperSpeed device is found, then a connection is established. If a SuperSpeed device is not found (as in the case where only a USB 2.0 device is connected to port 22), then the USB 2.0 Host 26 checks for the presence of a USB 2.0 device function (38) at device 20. Once the Host Controller 14 determines which device function is connected, it tells the USB 3.0 Hub 16 to only enable communication for downstream port 22 corresponding to whether the USB 2.0 device function 38 or SuperSpeed device function 40 is attached. This means that only one of the two parallel busses is in operation at any one time to an end device such as USB 3.0 device 20.

Furthermore, SuperSpeed USB has a different architecture from that of the USB 2.0 bus. Very high speed communication systems consume large amounts of power owing to high bit rates. A design requirement of SuperSpeed USB was lower power consumption, to extend the battery life of user devices. This has resulted in a change from the previous broadcast design of the USB 2.0: SuperSpeed is not a broadcast bus, but rather directs communication packets to a specific node in the system and shuts down communication on idle links.

This significantly affects any extension of the synchronisation schemes of, for example, U.S. patent application Ser. No. 12/279,328, whose method and apparatus for synchronising devices is based on a broadcast clock carrier signal that is delivered to each device on the bus, which is unsuitable in SuperSpeed USB.

A SuperSpeed Hub function acts as a device to the host (or upstream port) and as a host to the device (or downstream port). This means that the SuperSpeed Hub function acts to buffer and schedule transactions on its downstream ports rather than merely acting as a repeater. Similarly, the SuperSpeed Hub function does so with scheduling transmissions on the upstream port. A heavily burdened Hub function can therefore add significant non-deterministic delays in packet transmission through the system. This also precludes the use of USB 2.0 synchronisation schemes such as that of U.S. patent application Ser. No. 12/279,328 from operating on SuperSpeed USB.

The crude Isochronous synchronisation of USB 2.0 has been significantly improved in the USB 3.0 specification. Opening an Isochronous communication pipe between a Host Controller and a USB device guarantees a fixed bandwidth allocation in each Service Interval for the communication pipe. The Isochronous Protocol of USB 3.0 contains a so-called Isochronous Timestamp Packet (ITP), which is sent at somewhat regular intervals to each Isochronous Endpoint and which contains a timestamp of the beginning of ITP transmission by the USB Host Physical Layer (Phy) in the time domain of the Host Controller. The Isochronous Timestamp Packet is accurate to about 25 ns. SuperSpeed USB shuts down idle links to conserve power, but links must be active in order to receive an Isochronous Timestamp Packet. The Host Controller must therefore guarantee that all links to a device are in full active mode (termed power state U0) before transmission of the Isochronous Timestamp Packet.

Unfortunately the Isochronous Timestamp packet can be delayed in propagation down the USB network. USB 3.0 also does not provide a way of determining the propagation time of packets in SuperSpeed USB and hence no way of accurately knowing the phase relationship between time domains on different USB devices. Phase differences of several hundred nanoseconds are expected to be a best case scenario with SuperSpeed USB making it impractical for instrumentation or other precision timing requirements.

U.S. Pat. No. 5,566,180 (Eidson et al.) discloses a method of synchronising clocks in which a series of devices on a communication network transmit their local time to each other and network propagation time is determined by the ensemble of messages. Further disclosures by Eidson (U.S. Pat. Nos. 6,278,710, 6,665,316, 6,741,952 and 7,251,199) extend this concept but merely work toward a synchronisation scheme in which a constant stream of synchronising messages are transferred between each of the nodes of a distributed instrument network via Ethernet. This continual messaging consumes bandwidth and limits the accuracy of the possible synchronisation to several hundred nano-seconds in a point-to-point arrangement and substantially lower accuracy (typically micro-seconds) in a conventional switched subnet.

It should be understood that the terms 'clock signals' and 'synchronisation' in this disclosure are used to refer to clock signals, trigger signals, delay compensation information and propagation time measurement messages. It should also be understood that a 'notion of time' in this disclosure is used to denote an epoch or 'real time' and can also be used to refer to the combination of a clock signal and an associated epoch.

SUMMARY OF THE INVENTION

It is a general object of the present invention to enable precision synchronisation of a plurality USB devices, up to a predefined maximum, according to the USB3 Specification.

Thus, according to a first broad aspect, the present invention provides a method of reducing jitter in the local clock of a synchronised USB device attached to a USB hub, comprising:

observing a USB data stream (whether a SuperSpeed or non-SuperSpeed USB data stream) with said USB hub, said data stream having a data stream bit rate;

said USB Hub decoding a periodic signal structure in the USB data stream;

said USB Hub generating an event signal in response to decoding of the periodic signal structure; and said USB Hub locking the frequency of its local clock to the periodic event signal (whereby, the periodic event signal provides a reference to which the phase-locked-loop local clock of the USB Hub synchronises its frequency);

wherein the clock of the USB Hub is adapted to be the clocking source for circuitry of the USB Hub at substantially a multiple of a frequency of the bit rate.

A synchronised USB device typically operates by locking a local clock to a periodic data structure contained within the data stream. Typically a USB Start of Frame (SOF) packet is used as the periodic data structure, occurring at a frequency of 1 kHz or 8 kHz in the case of High Speed USB. This relatively low frequency signal is used by the USB device to lock the local clock of the attached USB Device using a PLL architecture. The frequency of the local clock is typically in the tens of MHz range.

Synchronisation of a plurality of USB devices can be compromised by the way that standard USB hubs process and retransmit data from an upstream port to a downstream port. It is another object of the present invention to provide a method for reducing the jitter in the local clock of a synchronised USB device. USB hubs contain their own free running clock which is used to decode data from the bus and then re-clock data onto the output port, either upstream or downstream. As a result, a periodic clock carrier signal transmitted from the host to all devices, such as the Start of Frame (SOF) token, typically has greater timing jitter on leaving a hub than it had when it arrived at the hub.

In the case of USB High Speed hubs operating at 480 Mb/s, the random phase relationship between the local hub clock and the SOF packet could result in an output SOF jitter of up to one bit time or about 4 ns, depending on the re-clocking scheme employed. Such a large indeterminate jitter on the reference clock signal is problematic for phase locked loop control systems and significantly increases the final clock stability. Cascaded hubs exacerbate the problem, potentially adding 4 ns of jitter for each layer.

Furthermore, a beating effect is present between the local hub clock rate and the bit rate of the USB data stream (or the rate of the host clock (or SOF rate)). If there is a significant difference in the frequency of the two clocks, then the hub's output SOF jitter is stochastic in nature when viewed over many cycles and the effect can be filtered out using a simple electrical filter or statistical technique. As the local hub clock's frequency approaches the frequency of the host clock, or one becomes close to an integer multiple of the other, a beating effect occurs. When the frequency of one clock closely approaches a multiple of the other's frequency, the hub's clock will appear to drift in and out of phase with the leading edge of the SOF token. The result is that when the clocks are in the in-phase condition, there will be minimal output phase error, but as the signals are almost exactly out of phase, the output phase error will be maximised.

Therefore the synchronised clocks of USB devices on different USB hubs will exhibit a significant beating effect owing to the periodic phase relationship between the host clock and the respective hub clocks. The effect will manifest itself as a periodic increase in inter USB-device jitter in line with the beating frequency of the two clocks.

It should be noted that there are two cases where clock jitter is minimised. In the first case, the two clocks are exactly synchronised and locked together or there is a constant phase relationship between the clocks (an integer multiple relationship). Under these conditions there is no time dependent re-clocking error. In the second case, the relationship between the two clocks is a long way from an integer multiple. Under these conditions the re-clocking error is stochastic in nature but can be easily filtered out using a low pass electrical filter or statistical means. The worst possible case is when the two clocks are almost syntonised (almost the same frequency) to an integer multiple. This is when beating occurs and jitter changes markedly with the beat frequency. Consider the case where there is a half hertz difference in the clock rates. This results in a two second beating effect of clocks being in phase and out of phase, resulting in a two second periodic increase in clock jitter.

Thus, the method allows clocking jitter to be reduced in a synchronised USB architecture. This system uses a hub repeater device whose local oscillator is synchronised to the timebase of the host controller. Synchronisation of the hub's local oscillator provides a constant phase relationship between USB data stream and reclocking device resulting in minimal reclocking phase error.

This aspect is applicable to a SuperSpeed USB data stream, but may also be employed with a High Speed USB system operating at 480 Mb/s.

In one embodiment, the USB data stream is observed at an upstream port of the USB Hub.

In an embodiment, the signal structure comprises one or more OUT tokens, IN tokens, ACK tokens, NAK tokens, STALL tokens, PRE tokens, SOF tokens, SETUP tokens, DATA0 tokens, DATA1 tokens, or programmable sequences bit patterns in the USB data packets.

In a particular embodiment, the periodic signal structure comprises one or more Start of Frame packet tokens.

In one embodiment, the periodic signal structure comprises one or more SuperSpeed USB Isochronous Timestamp Packets.

In one embodiment, the method comprises the local clock of the USB Hub employing statistical techniques or electrical filters to reduce the jitter of the local clock of the USB Hub.

In a particular embodiment, the frequency of the clock of the USB Hub is synchronised to be substantially an integer multiple of the USB bit stream data rate (in order to over-clock the sampling and retransmission of the USB data stream and to track the bit rate). In this way there is a constant phase relationship between the bit rate of the USB data stream and the clock used to retransmit the USB data stream, to minimise jitter in retransmission of the USB data stream by the USB Hub. This allows a synchronised USB device, adapted to synchronise its local clock to the periodic signal structures in the USB data stream, to reduce the jitter of its local synchronised clock.

In an embodiment, the clock of the USB Hub is synchronised to have a frequency that is substantially a half integer multiple (for example, 1.5 times, 2.5 times, 3.5 times, etc) of the bit rate and to track the bit rate. Therefore on average a random phase relationship exists between the bit rate of the USB data stream and the clock used to retransmit the USB data stream. This results in perhaps the largest cycle-to-cycle retransmission jitter of the USB data stream by the USB Hub. However when a synchronised USB device, adapted to synchronise its local clock to the periodic signal structures in the USB data stream, uses statistical techniques (or even a simple electrical low pass filter) to reduce clocking jitter, the randomisation of USB Hub retransmission jitter results in minimal jitter in the USB device local clock.

In a second broad aspect, the present invention therefore provides an apparatus for reducing clocking jitter in a synchronised USB architecture, the apparatus comprising:

USB Hub circuitry with a local clock, an upstream port, a plurality of downstream ports and circuitry for communicating toward a Host Controller through the upstream port and for communicating toward USB devices through the downstream ports;

a monitor (such as in the form of monitoring circuitry) adapted to observe a USB data stream (whether a SuperSpeed or non-SuperSpeed USB data stream) having a bit rate;

a decoder (such as in the form of decoding circuitry) adapted to decode a periodic data structure in the USB data stream;

a signal generator (such as in the form of signal generating circuitry) adapted to generate an event signal in response to decoding of the periodic data structures;

circuitry (such as in the form of phase-locking circuitry) adapted to lock a frequency of the clock of the USB Hub circuitry with respect to the frequency of the event signal;

wherein the clock of the USB Hub circuitry is adapted to be the clocking source for the hub circuitry of the USB Hub circuitry at substantially a multiple of a frequency of the bit rate of the USB data stream.

Thus, the invention also provides an apparatus for clocking jitter to be reduced in a synchronised USB architecture.

In one embodiment, the monitor is adapted to observe the USB data stream at the upstream port.

In an embodiment, the periodic signal structure comprises one or more OUT tokens, IN tokens, ACK tokens, NAK tokens, STALL tokens, PRE tokens, SOF tokens, SETUP tokens, DATA0 tokens, DATA1 tokens, or programmable sequences bit patterns in the USB data packets.

In one embodiment, the clock of the USB Hub circuitry is synchronised to be substantially an integer multiple of the USB bit stream data rate (in order to over-clock the sampling and retransmission of the USB data stream) and to track the bit rate.

In an embodiment, the clock of the USB Hub circuitry is synchronised to be substantially a half integer multiple (for example, 1.5 times, 2.5 times, 3.5 times, etc) of the bit rate and to track the USB bit stream data rate. According to this embodiment, a free running oscillator that is roughly a half integer multiple of the bit rate would also be an appropriate solution.

In a third broad aspect, the present invention a method of reducing jitter in the local clock of a synchronised USB device attached to a USB Hub having a local clock and repeater circuitry, comprising:
controlling a frequency of said local clock of said USB Hub;
wherein said clock is adapted to be a clocking source for said repeater circuitry of the USB Hub at substantially a multiple of the frequency of the bit rate.

The method may include controlling said frequency of said local clock of said USB Hub around a central frequency being the frequency of a USB data stream bit rate.

In one embodiment, the controlling of said frequency utilises a control signal of sine-wave, saw-tooth or triangular wave form.

In another embodiment, the controlling of said frequency utilises noise as a control signal.

In a fourth broad aspect, the present invention an apparatus for reducing clocking jitter in a synchronised USB architecture, the apparatus comprising:
a clock; and
a clock controller or clock controller circuitry;
wherein said clock controller or clock controller circuitry is adapted to control said clock by adjusting a supply voltage of said clock.

In a fifth broad aspect, the invention provides an apparatus for reducing clocking jitter in a synchronised USB architecture, the apparatus comprising:
a clock having a frequency;
a feedback stabiliser adapted to stabilise the frequency of said clock by feedback control;
a clock controller or clock controller circuitry;
wherein said clock controller or clock controller circuitry is adapted to control said clock by injecting a perturbation signal into the feedback stabiliser of said clock.

In a sixth broad aspect, the invention provides a method of reducing jitter in the local clock of a synchronised USB device attached to a USB hub in a USB network, the method comprising:
determining a layer of said USB Hub within said USB network;
setting a frequency of a clock of said USB Hub depending on said layer of said USB Hub within said USB network so as to avoid matching a frequency of a data bit rate of a USB data stream that is immediately upstream to said USB Hub to within a predefined level.

In one embodiment, the predefined level is 1 kHz. In another embodiment, the predefined level is 100 kHz.

In a particular embodiment, the determining of said layer of said USB Hub comprises querying a routing string address of said USB Hub.

In another embodiment, the determining of said layer of said USB Hub comprises querying with software an operating system of a USB Host Controller to which said USB network is connected for information about a physical connection layer of said USB Hub.

In a particular embodiment, the determining of said layer of said USB Hub comprises measuring the frequency of said USB data stream at an upstream port of said USB Hub.

In a seventh broad aspect, the invention provides an apparatus for determining the bit rate of a USB data stream received at the upstream port of a USB Hub, the apparatus comprising:

a clock of known or determinable frequency;
circuitry to observe said USB data stream from said upstream port of said USB Hub; and
circuitry to compare the frequency of said clock and said USB data stream and thereby determine said bit rate.

In an eighth broad aspect, the invention provides a system for reducing jitter in the local clock of a synchronised USB device attached to a USB Hub, comprising:
a monitor adapted to observe a USB data stream having a bit rate;
a decoder adapted to decode a periodic data structure in said USB data stream;
a signal generator adapted to generate an event signal in response to decoding of said periodic data structures;
a USB Hub or USB hub circuitry, having a clock;
circuitry to compare the frequency of said clock of said USB Hub or USB hub circuitry and said USB data stream and thereby to determine said bit rate; and
circuitry adapted to lock a frequency of said clock of said USB Hub or USB hub circuitry with respect to the frequency of said event signal;
wherein said clock of said USB Hub or USB hub circuitry is adapted to be the clocking source for said USB Hub at substantially a multiple of a frequency of said bit rate of said USB data stream such that the constant phase relationship between said clocking source and said USB data stream reduces jitter in said local clock of said USB device.

In one embodiment, the frequency of said clock of said USB Hub or USB hub circuitry is synchronised to substantially an integer multiple of said bit rate, wherein there is a constant phase relationship between said USB data stream and said clock of said USB Hub or USB hub circuitry.

In another embodiment, the frequency of said clock of said USB Hub or USB hub circuitry is synchronised to substantially a half integer multiple of said bit rate, wherein there is a rapidly changing phase relationship between said USB data stream and said clock of said USB Hub or USB hub circuitry at reception of each subsequent of said periodic signal structures.

It should be noted that all the various features of each of the above aspects of the invention can be combined as suitable and desired.

Furthermore, it should be noted that the invention also provides apparatuses and systems arranged to perform each of the methods of the invention described above.

In addition, apparatuses according to the invention can be embodied in various ways. For example, such devices could be constructed in the form of multiple components on a printed circuit or printed wiring board, on a ceramic substrate or at the semiconductor level, that is, as a single silicon (or other semiconductor material) chip.

BRIEF DESCRIPTION OF THE DRAWINGS

In order that the present invention may be more clearly ascertained, embodiments will now be described, by way of example, with reference to the accompanying drawing, in which:

FIG. 1 is a schematic diagram of the dual-bus architecture of USB3 according to the background art;

FIG. 2 is a graphical representation of the beat frequency for inter-device jitter variations when USB data streams are clocked by USB Hubs with varying clock mismatch according to the background art;

DETAILED DESCRIPTION OF THE INVENTION

Synchronised USB devices lock a local clock to periodic signal structures found within the USB data stream. Any jitter in the timing of these periodic signals degrades the USB device's local clock phase accuracy. Synchronised clocks of USB devices on different USB hubs will exhibit a significant beating effect due to the periodic phase relationship between the host clock and the respective hub clocks. The effect will manifest itself as a periodic change in the inter USB-device jitter in line with the beating frequency of the two clocks.

Referring to FIG. 2, graph 50 illustrates this effect of USB Hub clock rate on the clock jitter observed in a synchronised USB device.

Graph 50 plots beat frequency ($f_b$) against mismatch in clocks (δ) between a Host Controller clock (or bit time of the USB data stream) and a USB hub clock. When one clock is an integer multiple of the other clock frequency (such as at 52), there is a constant phase relationship between clocks and no beating effect is observed. As the mismatch increases away from an integer multiple (viz. either side of being perfectly matched 52), the periodic increases in inter-device jitter becomes noticeable with a very slow beat frequency. As the mismatch increases further the beat frequency increases to a level 54 (or 'filter level'), it is beating fast enough for a low pass filter to suppress the periodic jitter, as is effected according to this embodiment.

Figure 3:
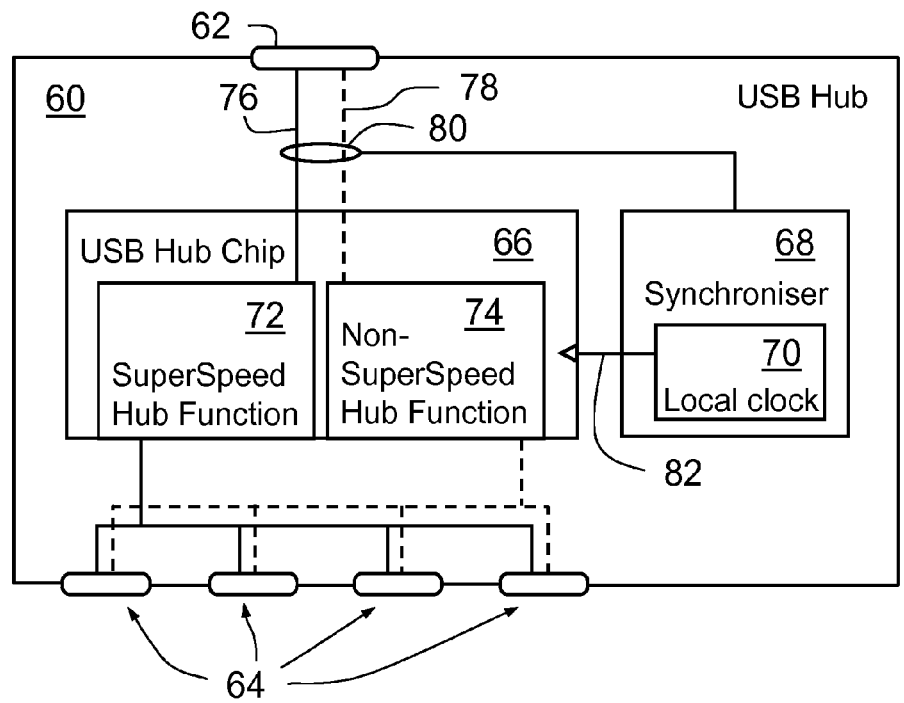
FIG. 3 is a schematic representation of a jitter minimising USB Hub according to an embodiment of the present invention.

FIG. 3 is a schematic representation of a USB Hub 60 according to a further embodiment of the present invention. According to this embodiment, the jitter in clocks locked to a periodic signal contained in a data stream, particularly a USB data stream, can be reduced by using synchronous clocks in the entire path and more specifically in USB hubs that reclock data to downstream ports. USB Hub 60 comprises an upstream port 62 for communicating towards a Host Controller (not shown), a plurality of downstream ports 64 for communicating to downstream hubs and devices (not shown), a USB Hub chip 66 and a Synchroniser 68 containing a local clock 70.

USB Hub chip 66 has a SuperSpeed Hub Function 72 and a non-SuperSpeed Hub function 74 (though in certain variations of this embodiment, USB Hub chip 66 may contain only a non-SuperSpeed Hub Function). In use, SuperSpeed Hub Function 72 receives SuperSpeed communications 76 from upstream port 62 and passes them to downstream ports 64 and vice versa. Similarly, non-SuperSpeed Hub Function 74 receives non-SuperSpeed communications 78 from upstream port 332 and passes them to downstream ports 334 and vice versa.

Synchroniser 68 is operable to monitor SuperSpeed communications on SuperSpeed channel 76, non-SuperSpeed communications non-SuperSpeed channel 78, or both SuperSpeed communications 76 and non-SuperSpeed communications on channels 76 and 78, at detection point 80 to lock its local clock 70 to the Host Controller's clock rate by any suitable technique. Local clock 70 of Synchroniser 68 provides a local clock signal 82 that is syntonised to the data rate of the USB data streams on channels 76 and 78, and this local clock signal 82 is used by USB Hub chip 336 to clock and retransmit USB data streams to downstream ports 64.

In this embodiment, local clock 70 is syntonised to the bit rate of the USB communications, which results in a constant phase relationship between those communications signals and the sampling and retransmission functions of the USB Hub chip 66. This results in minimal packet to packet reclocking jitter which in turn allows a more precise phase lock by attached synchronised devices.

According to another variation of this embodiment, clock signal 82 may be adjusted to have a small frequency offset from a clock carrier signal detected at 80. In this way the relative phase between the Host Controller's Clock and the Local Clock will vary in time. The phase errors associated with the hub reclocking through the USB data stream will therefore vary in time. However the frequency of this periodic variation in phase error can be set by the Host (by setting the slight frequency offset). A low pass filter may then be used in a synchronised USB device attached downstream of this port with its cut-off frequency set as to remove the time variance in clocking jitter (see FIG. 2).

Figure 4:
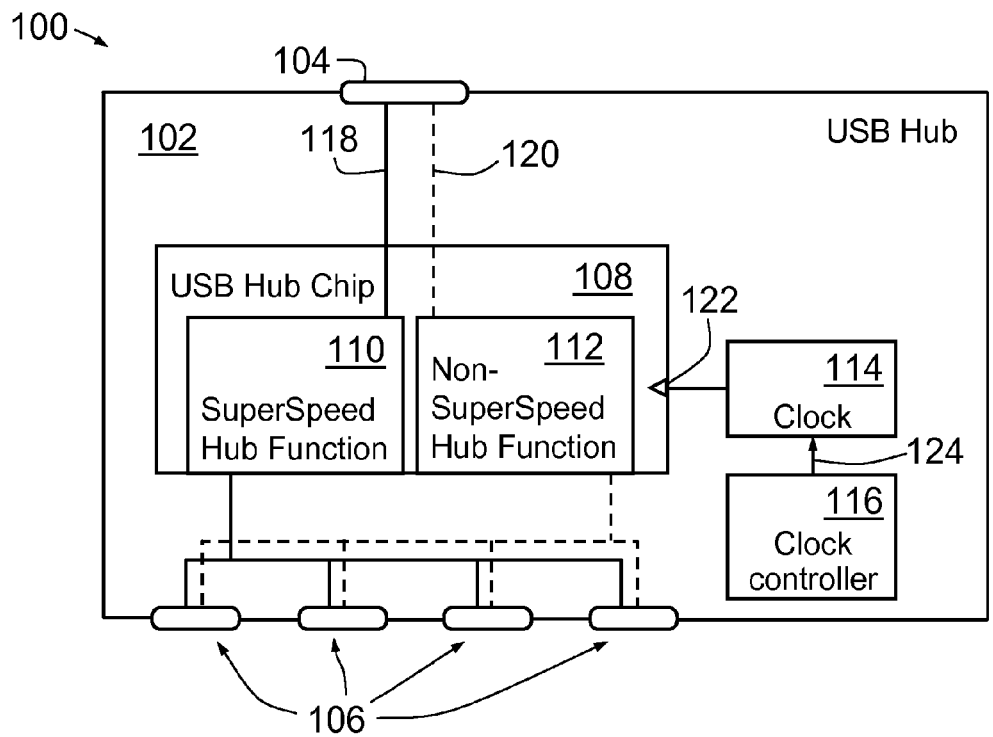
FIG. 4 is a schematic representation of a USB Hub according to an embodiment of the present invention, incorporating circuitry for controlling the reclocking frequency of said USB Hub.

FIG. 4 is a schematic representation of a jitter reduction apparatus 100 according to an embodiment of the present invention. Apparatus 100 comprises a USB Hub 102 that has an upstream port 104, a plurality of downstream ports 106, a USB Hub chip 108 (containing a SuperSpeed Hub function 110 and a non-SuperSpeed Hub function 112), a clock 114 and a clock controller 116.

USB Hub chip 108 receives from upstream port 104 a SuperSpeed USB data stream 118 and a non-SuperSpeed USB data stream 120, which are reclocked by SuperSpeed Hub function 110 and non-SuperSpeed Hub function 112 respective to downstream ports 106. Clock 114 provides a clocking signal to a clock input pin 122 of the USB Hub chip 108.

A conventional clock of a USB of the background art comprises a simple crystal oscillator circuit that typically operates at 12 MHz or 48 MHz (and is not accompanied by a clock controller (cf. clock controller 116). A conventional clock is a free running oscillator and has clock frequency tolerance of typically 50 parts per million (ppm) to 100 ppm.

By contrast, apparatus 100 includes clock controller 116, which generates a control signal 124 to which clock 114 is slaved, therefore providing a mechanism for clock controller 116 to control the frequency and phase of clock 114. Consequently, apparatus 100 has a slightly more sophisticated clock 114 in which the frequency and/or phase can be controlled.

Figure 5:
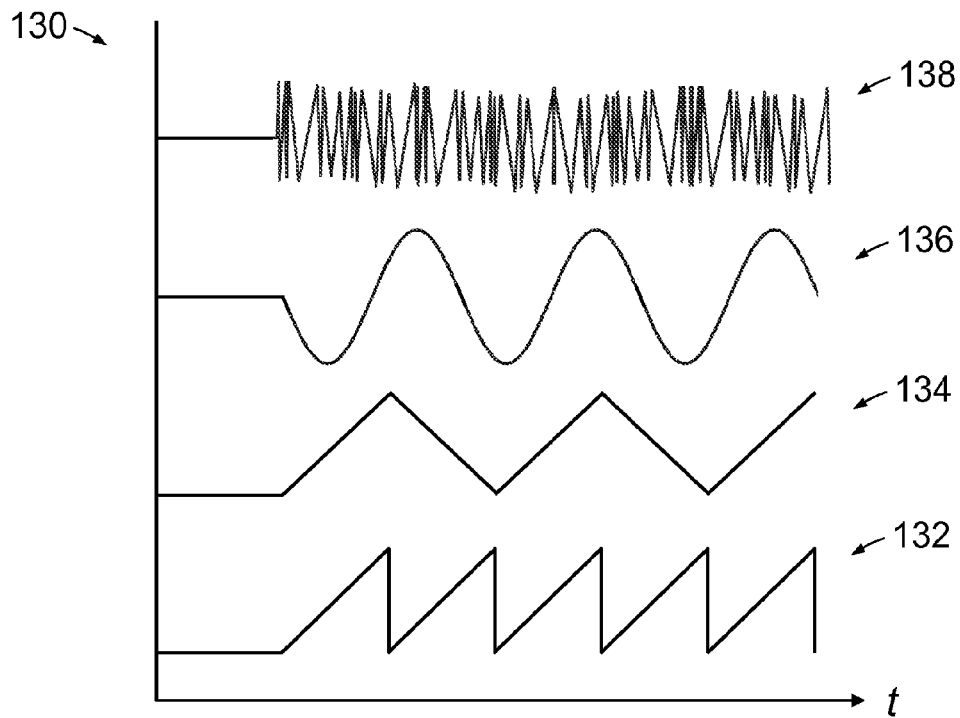
FIG. 5 is a schematic representation of control signals applied to the clock of a USB hub of FIG. 4.

In this embodiment, control signal 824 is a periodic function, such as (but not limited to) a triangle wave, a saw-tooth function or a sine wave function. FIG. 5 is a schematic plot 130 of exemplary control signals 124, including a saw-tooth function 132, a triangle function 134 and a sine-wave function 136.

According to the embodiment of FIG. 4, in use control signal 124 creates a 'chirp' or periodic change in the frequency of clock 114. These periodic fluctuations in frequency, if rapid enough, have the effect of randomising the relative phase of the clock 114 to the USB data stream seen at upstream port 104.

In a variation of this embodiment, control signal 124 is a 'noise' signal (see exemplary noise signal 138 in FIG. 5), in the sense that the signal is random in time. This electrical noise when injected into clock 114 causes random fluctuations in frequency that have the effect of randomising the relative phase of clock 114 to the USB data stream seen at upstream port 104. There are various forms of electrical noise, the most common being 'White Noise', which has a flat power spectral density. There are many other technical definitions of noise, such as 'pink noise', 'Brownian noise', etc, that have different spectral densities, but in general any noise signal may be injected into clock 114.

The frequency stability of electrical oscillators are generally susceptible to variations in supply voltage. In this embodiment, control signal 124 controls the supply voltage circuitry of clock 114. In another variation of this embodiment, control signal 124 is injected into frequency control circuitry of clock 114. In general, control signal 124 is adapted to be injected into any part of the circuitry of clock 114 such that it can directly affect the frequency of clock 114.

In another variation of this embodiment, clock 814 is controlled at a fixed frequency, but at a prescribed offset from the nominal High Speed USB rate of 480 Mb/s (240 MHz). If the offset frequency is large enough, any time varying difference in the frequency of clock 114 and the USB data stream bit rate at upstream port 104 will be at a frequency that can be removed (filtered) from the clock of an attached and syntonised USB device.

Figure 6:
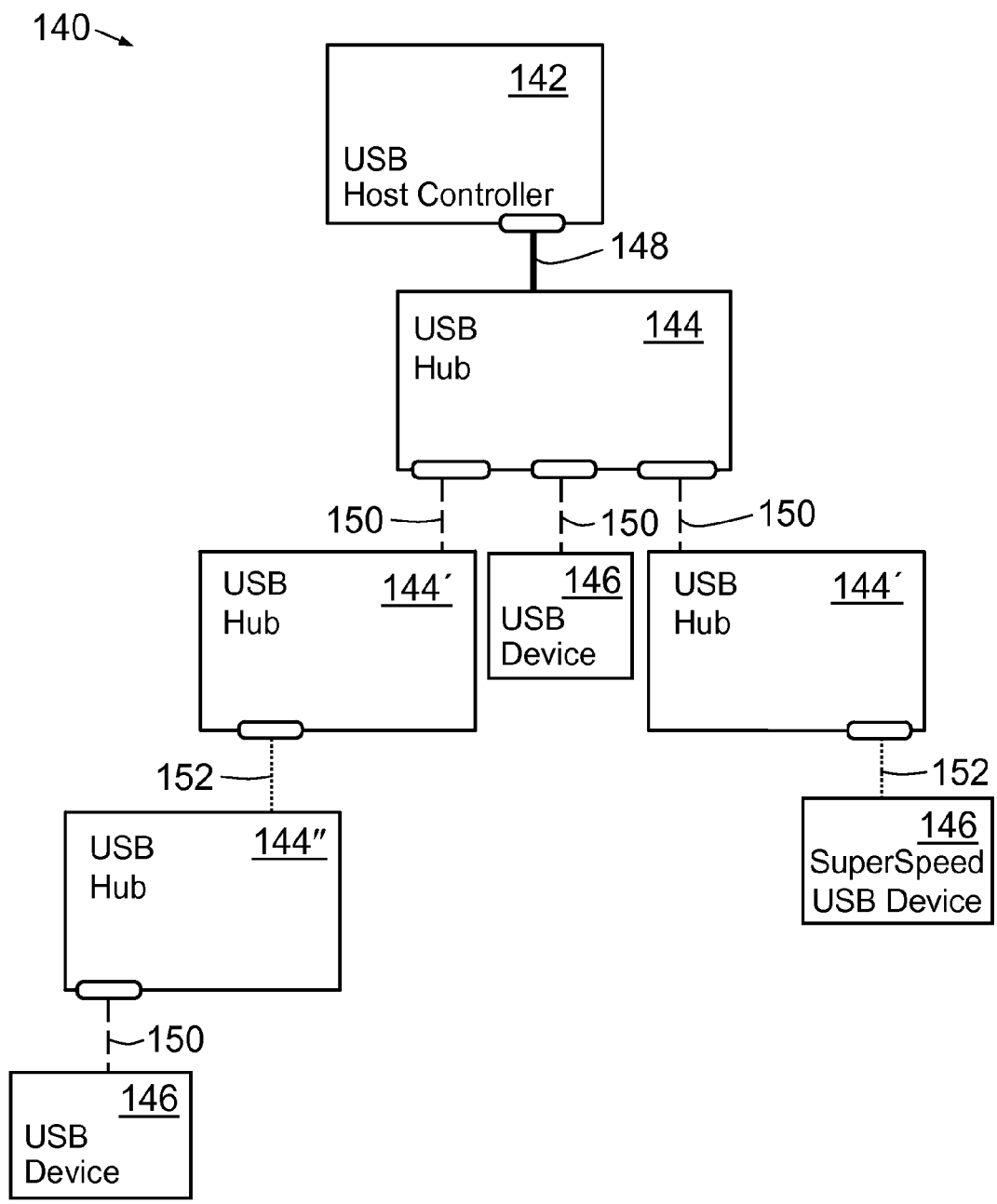
FIG. 6 is a schematic representation of a USB network according to an embodiment of the present invention.

This approach works for a first USB hub attached to a USB Host Controller, but not for subsequently attached downstream hubs. This can be understood by reference to figure if be explained by way of example. Consider the USB network shown schematically at 140 in FIG. 6. Referring to FIG. 6, USB network 140 includes a USB Host Controller 142 attached to a tiered star USB network comprising USB Hubs 144, 144', 144" and USB Devices 146.

USB Host Controller 142 transmits data 148 at the nominal High Speed USB bit rate, $F_{USB}$, of 480 Mb/s (or SuperSpeed bit rate of 5 Gb/s). A first layer attached USB Hub 144 is configured to operate its clock (cf. clock 114 of USB Hub 102 of FIG. 4) at a small but constant offset, $F_{offset}$, from the nominal bit rate $F_{USB}$. The bit rate of the USB data stream at this point 150 is $F_{USB}+F_{Offset}$. This frequency offset, $F_{Offset}$, is large enough to allow filtering of any high frequency components from the syntonised clock of a USB Device 146 attached at this point.

In the next attached layer, USB Hubs 144' operate their respective clocks (cf. clock 114 of USB Hub 102) at a frequency at least $F_{offset}$ away from the bit rate (viz. $F_{USB}+F_{Offset}$) at point 150 of the first layer USB Hub 144. This can hence be at either $F_{USB}$ or ($F_{USB}+2\times F_{Offset}$), for example; however, for practical reasons it may be preferred to operate USB Hubs 144' at ($F_{USB}-F_{Offset}$), as is the case in this example at point 152. In the next attached layer, USB Hub 144" operates at $F_{USB}+F_{Offset}$ for convenience.

In this way, a USB hub need only know its layer within the tiered star topology in order to set its clock offset either higher or lower than the nominal USB bit rate. This allows a very simple control circuitry for each USB Hub to set its respective clock either slightly fast or slightly slow, without the complexities of a periodic or noisy control signal.

Figure 7:
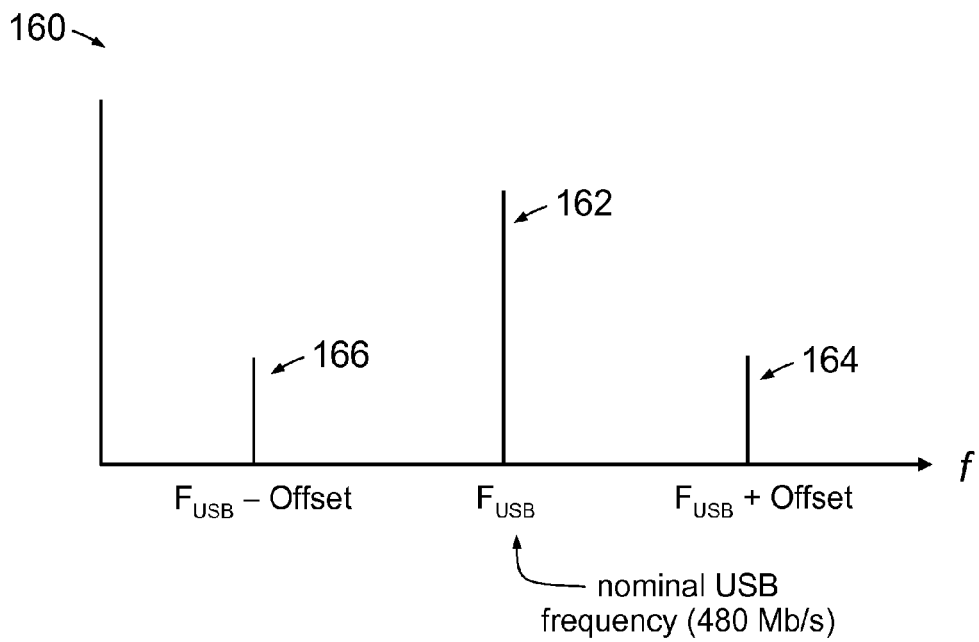
FIG. 7 is a schematic representation of the reclocking frequency of the various hub layers in FIG. 6.

FIG. 7 is a schematic representation of the frequency space 160 of USB data transmissions of FIG. 6. USB Host Controller 142 transmits data 162 at the nominal USB data rate of 480 Mb/s, $F_{USB}$. Odd layered hubs (i.e. first layer, third layer, fifth layer, etc) operate at a positive offset 164 from the nominal USB data rate, $F_{USB}+F_{Offset}$. Even layered hubs (i.e. second layer, fourth layer, etc) operate at a negative offset 166 from of the nominal USB data rate, $F_{USB}-F_{Offset}$. It will be readily apparent to those skilled in the art, however, that it is also entirely acceptable to employ a negative offset for the odd layered hubs and a positive offset for the even layered hubs.

The present embodiment of this invention is furthermore advantageous in the case of SuperSpeed USB. SuperSpeed Hubs are assigned a pseudo 'address' by way of the 'routing string' that is contained in the header of each packet. Each hub automatically knows its position within the hierarchy and can therefore automatically assign its frequency offset to be either positive or negative.

In the case of non-SuperSpeed USB hubs, the position of the hubs must be identified by a software layer and additional circuitry employed to receive messaging from the Host Controller to inform them of their place in the layered network. In a preferred embodiment this might take the form of a USB device located wholly within the Hub and connected to one of the downstream ports of said hub. Clock controller (such as clock controller 116 of FIG. 4) might then be incorporated into such an internal USB device.

In another embodiment, a USB Hub (cf. USB Hub 102 of FIG. 4) initialises with its clock 114 to the nominal frequency of the USB data stream bit rate. The clock controller 116 then compares its rate with the bit rate of the USB data stream. If the offset is chosen appropriately (as described above), it is possible to determine if the data stream at upstream port 104 of USB Hub 102 is at the nominal USB bit rate $F_{USB}$ (implying that the hub is at level 1), at $F_{USB}+F_{Offset}$ or $F_{USB}-F_{Offset}$ (implying that it is either an even or odd hub layer, according to the selected scheme). Hub layer 1 is a special case. This simple test of the data bit rate received at upstream port 104 is enough to determine whether clock controller 116 should set the frequency of clock 114 to $F_{USB}-F_{Offset}$ or to $F_{USB}+F_{Offset}$.

In yet another embodiment, an adaptive clock is used by a USB Hub to reclock data from upstream to downstream ports. In this approach, the USB Hub (cf. USB Hub 102 of FIG. 4) has a clock 114 that is oversamples the USB data stream. The clock 114 can lock onto the phase of the USB data stream packet very quickly, typically within the sync field at the start of the packet. Once the phase of the packet has been determined with respect to clock 114, the phase that most closely aligns with this sync pattern is subsequently used to clock the packet through to downstream ports 106.

Modifications within the scope of the invention may be readily effected by those skilled in the art. It is to be understood, therefore, that this invention is not limited to the particular embodiments described by way of example hereinabove and that combinations of the various embodiments described herein are readily apparent to those skilled in the art.

In the preceding description of the invention and in the claims that follow, except where the context requires otherwise owing to express language or necessary implication, the expression "Host Controller" embraces all forms of USB Host Controller, including standard USB Host controllers, USB-on-the-go Host Controllers and wireless USB Host Controllers.

In the preceding description of the invention and in the claims that follow, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to background art is not intended to imply that such background art forms or formed a part of the common general knowledge in any country.

The invention claimed is:

1. A method of reducing jitter in a local clock of a synchronised USB device arising from re-clocking errors in repeater circuitry of a USB hub to which said USB device is attached, comprising:
   observing a USB data stream with said USB Hub, said data stream having a data stream bit rate;
   said USB Hub decoding a periodic signal structure in said USB data stream;
   said USB Hub generating an event signal in response to decoding of said periodic signal structure; and
   said USB Hub locking a frequency of a local clock of said USB Hub to said periodic event signal;
   wherein said local clock of said USB Hub is adapted to be a clocking source for said repeater circuitry of said USB Hub, said local clock having a frequency that is controlled to be substantially an integer multiple of a frequency of the data stream bit rate or such that a beat frequency between said local clock frequency and the data stream bit rate frequency is above a cutoff frequency of a low pass filter to avoid jitter due to beating effect caused by a difference in frequency between the data stream bit rate and said local clock.

2. A method as claimed in claim 1, wherein said frequency of said clock of said USB Hub is synchronised to substantially an integer multiple of said USB bit stream data rate, wherein there is a constant phase relationship between said USB data stream and said clock of said USB Hub.

3. A method as claimed in claim 1, wherein said frequency of said clock of said USB Hub is synchronised to substantially a half integer multiple of said USB bit stream data rate, wherein there is a rapidly changing phase relationship between said USB data stream and said clock of said USB Hub at reception of each subsequent of said periodic signal structures.

4. A method as claimed in claim 1, comprising said local clock of said USB Hub employing statistical techniques or electrical filters to reduce the jitter of said local clock of the USB Hub.

5. A method as claimed in claim 1, further comprising:
   determining a layer of said USB Hub within a USB network;
   setting the frequency of said local clock of said USB Hub depending on said layer of said USB Hub within said USB network so as to avoid matching a frequency of a data bit rate of a USB data stream that is immediately upstream to said USB Hub to within a predefined level.

6. A method as claimed in claim 1, wherein said predefined level is 1 kHz or 100 kHz.

7. A method as claimed in claim 1, wherein said determining of said layer of said USB Hub comprises:
   i) querying a routing string address of said USB Hub;
   ii) querying with software an operating system of a USB Host Controller to which said USB network is connected for information about a physical connection layer of said USB Hub; or
   iii) measuring the frequency of said USB data stream at an upstream port of said USB Hub.

8. An apparatus for reducing jitter in the local clocks of USB devices in a synchronised USB architecture arising from re-clocking errors in USB Hub circuitry to which said USB devices are attached, the apparatus comprising:
   USB Hub circuitry with a local clock, an upstream port, a plurality of downstream ports, circuitry for communicating toward a Host Controller through said upstream port and for communicating toward the USB devices through said plurality of downstream ports;
   a monitor adapted to observe a USB data stream having a bit rate;
   a decoder adapted to decode a periodic data structure in said USB data stream;
   a signal generator adapted to generate an event signal in response to decoding of said periodic data structures;
   circuitry adapted to lock a frequency of said local clock of said USB Hub circuitry with respect to the frequency of the event signal;
   wherein said local clock of said USB Hub circuitry is adapted to be the clocking source for said USB Hub circuitry, said local clock having a frequency that is controlled to be substantially a multiple of a frequency of said USB data stream bit rate or such that a beat frequency between said local clock frequency and the data stream bit rate frequency is above a cutoff frequency of a low pass filter to avoid jitter due to beating effect caused by a difference in frequency between the data stream bit rate and said local clock.

9. An apparatus as claimed in claim 8, wherein said frequency of said local clock of said USB Hub circuitry is synchronised to substantially an integer multiple of said USB bit stream data rate, wherein there is a constant phase relationship between said USB data stream and said local clock of said USB Hub circuitry.

10. An apparatus as claimed in claim 8, wherein said frequency of said local clock of said USB Hub circuitry is synchronised to substantially a half integer multiple of said USB bit stream data rate, wherein there is a rapidly changing phase relationship between said USB data stream and said local clock of said USB Hub circuitry at reception of each subsequent of said periodic signal structures.

11. A system for reducing jitter in the local clock of a synchronised USB device arising from re-clocking errors in a USB Hub or USB hub circuitry to which said USB device is attached, comprising:
   a monitor adapted to observe a USB data stream having a bit rate;
   a decoder adapted to decode a periodic data structure in said USB data stream;
   a signal generator adapted to generate an event signal in response to decoding of said periodic data structures;
   a USB Hub or USB hub circuitry, having a clock;
   circuitry to compare the frequency of said clock of said USB Hub or USB hub circuitry and said USB data stream and thereby to determine said bit rate; and
   circuitry adapted to lock a frequency of said clock of said USB Hub or USB hub circuitry with respect to the frequency of said event signal;
   wherein said clock of said USB Hub or USB hub circuitry is adapted to be the clocking source for said USB Hub, said clock having a frequency that is controlled to be substantially a multiple of a frequency of said bit rate of said USB data stream or such that a beat frequency between said clock frequency and the data stream bit rate frequency is above a cutoff frequency of a low pass filter to avoid jitter due to beating effect caused by a difference in frequency between the data stream bit rate and said local clock.

12. A system as claimed in claim 11, wherein said frequency of said clock of said USB Hub or USB hub circuitry is synchronised to substantially an integer multiple of said bit rate, wherein there is a constant phase relationship between said USB data stream and said clock of said USB Hub or USB hub circuitry.

13. A system as claimed in claim 12, wherein said frequency of said clock of said USB Hub or USB hub circuitry is synchronised to substantially a half integer multiple of said bit rate, wherein there is a rapidly changing phase relationship between said USB data stream and said clock of said USB Hub or USB hub circuitry at reception of each subsequent of said periodic signal structures.

\* \* \* \* \*